United States Patent
Monereau et al.

(10) Patent No.: US 6,402,809 B1
(45) Date of Patent: Jun. 11, 2002

(54) MANAGEMENT OF AN AIR PURIFICATION SYSTEM WITH THERMAL REGENERATION

(75) Inventors: Christian Monereau, Paris (FR); Didier Miniscloux, Houston, TX (US); Alain Combier, Madrid (ES)

(73) Assignee: L'Air Liquide, Societe Anonyme a Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 42 days.

(21) Appl. No.: 09/652,792

(22) Filed: Aug. 31, 2000

(30) Foreign Application Priority Data

Sep. 3, 1999 (FR) .............................. 99 11085

(51) Int. Cl.[7] .............................................. B01D 53/04
(52) U.S. Cl. .................... 95/14; 95/15; 95/18; 95/21; 95/99; 95/105; 95/106; 95/120; 95/123; 95/139; 96/112; 96/113; 96/130; 96/144
(58) Field of Search .......................... 95/8, 10, 11, 14, 95/15, 17–19, 21–23, 99, 105, 106, 115, 117–120, 123, 139; 96/110–114, 130, 143, 144

(56) References Cited

U.S. PATENT DOCUMENTS

| | | | |
|---|---|---|---|
| 4,197,095 A | | 4/1980 | Picket et al. |
| 4,247,311 A | * | 1/1981 | Seibert et al. ................. 96/111 |
| 4,605,425 A | * | 8/1986 | Verrando et al. .......... 96/111 X |
| 4,693,730 A | * | 9/1987 | Miller et al. ...................... 95/8 |
| 4,816,043 A | * | 3/1989 | Harrison .................... 96/130 X |
| 4,832,711 A | * | 5/1989 | Christel, Jr. et al. ...... 96/112 X |
| 4,857,086 A | * | 8/1989 | Kawai .............................. 96/111 |
| 4,927,434 A | * | 5/1990 | Cordes et al. ............. 96/113 X |
| 5,137,548 A | | 8/1992 | Gastinne et al. |
| 5,389,125 A | * | 2/1995 | Thayer et al. ............. 96/112 X |
| 5,989,313 A | * | 11/1999 | Mize ......................... 96/111 X |
| 6,273,936 B1 | * | 8/2001 | Barry et al. ............... 96/111 X |

FOREIGN PATENT DOCUMENTS

| | | |
|---|---|---|
| EP | 0 718 024 | 6/1996 |
| EP | 0 925 821 | 6/1999 |
| SU | 929178 | 5/1982 |
| WO | WO 9954023 | 10/1999 |

\* cited by examiner

Primary Examiner—Robert H. Spitzer
(74) Attorney, Agent, or Firm—Young & Thompson

(57) ABSTRACT

A process and a system for purifying gas, such as air, before cryogenic distillation, in which at least one energy parameter, chosen from the flow rate of the regeneration gas entering and/or leaving at least one adsorber, the duration of the regeneration step and the regeneration temperature of the regeneration gas entering at least one adsorber, is controlled, modified and/or regulated depending on at least one operating condition chosen from the pressure of the gas to be purified entering and/or leaving at least one adsorber, the flow rate of the gas to be purified entering and/or leaving at least one adsorber, the temperature (Ta) of the gas to be purified entering at least one adsorber and the content of impurities contained in the gas to be purified entering at least one adsorber and depending on the thermal profile of the heat front output by at least one adsorber at the end of regeneration.

12 Claims, 1 Drawing Sheet

US 6,402,809 B1

MANAGEMENT OF AN AIR PURIFICATION SYSTEM WITH THERMAL REGENERATION

FIELD OF THE INVENTION

Figure 1:
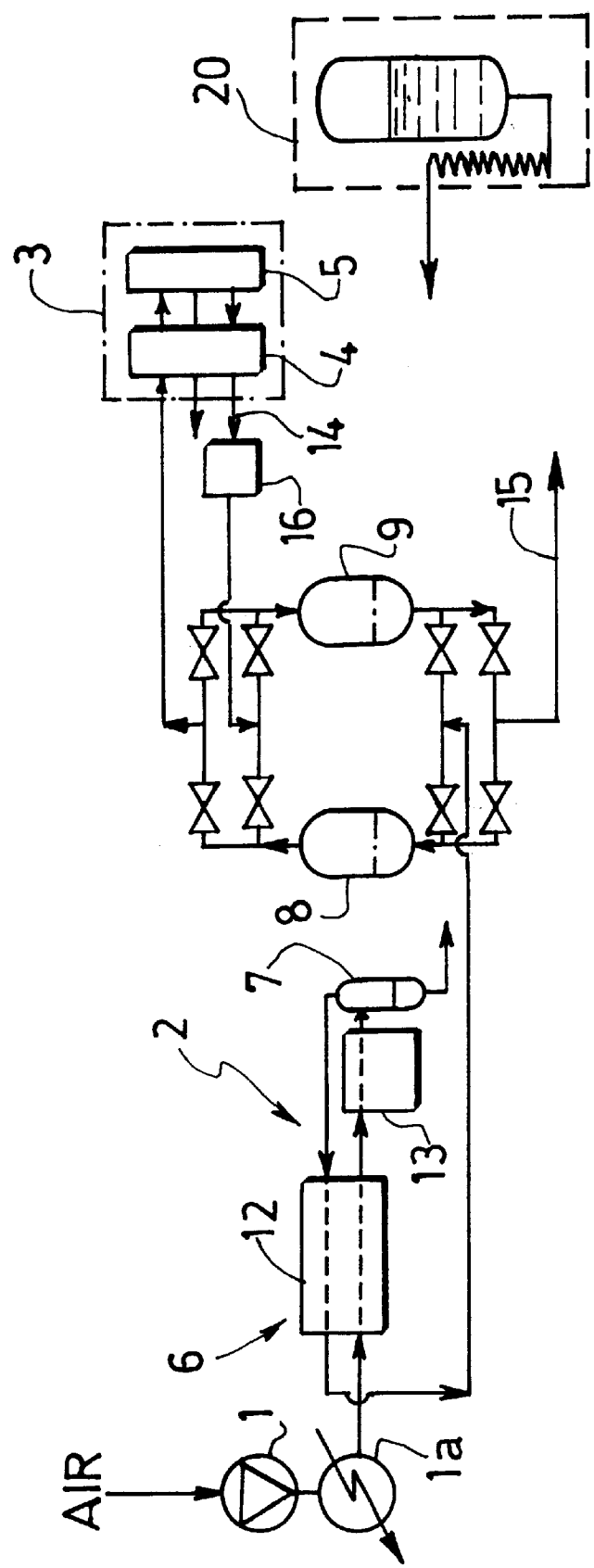

The invention relates to the purification of air intended to be cyrogenically fractionated, of the type in which the air is dried, decarbonated and at least partially stripped of the secondary atmospheric contaminates, such as hydrocarbons, nitrogen oxides, etc., by passing it through one or more bodies of adsorbent.

BACKGROUND OF THE INVENTION

Conventionally, the body of adsorbent is cyclically regenerated by heating and/or flushing before it is used again in the adsorption phase.

At the present time, two types of processes are more particularly used for this purpose, namely:

PSA processes in which most of the regeneration power is provided by a pressure effect; and TSA processes in which most of this same regeneration power is provided by a temperature effect.

Less conventionally, hybrid solutions have also been proposed for this purpose, especially in document U.S. Pat. No. 5,614,000.

Usually, a TSA (Temperature Swing Adsorption) process for purifying air comprises the following steps:

a) purification of the air by adsorption of the impurities at superatmospheric pressure and at ambient temperatures;

b) depressurization of the adsorber down to atmospheric pressure;

c) regeneration of the adsorbent at atmospheric pressure, especially by the residual or waste gases, typically impure nitrogen coming from an air separation unit and heated to a temperature above ambient by means of one or more heat exchangers;

d) cooling the adsorbent down to ambient or subambient temperature, especially by continuing to introduce air into the waste gas coming from the air separation unit, but this air not being heated;

e) repressurization of the adsorber with purified air coming, for example, from another adsorber in production phase.

Less conventionally, the regeneration may be carried out at a pressure substantially different from atmospheric pressure, either greater or even less than the latter by using, in this case, suitable vacuum pumping means.

As regards a PSA (Pressure Swing Adsorption) process cycle for purifying air, this comprises substantially the same steps a), b) and e) but is distinguished from a TSA process by the absence of heating of the waste gas or gases during the regeneration step (step c), and therefore the absence of step d), and, in general, a shorter cycle time than in the TSA process.

In general, the air pretreatment devices comprise two adsorbers, operating alternately, that is to say one of the adsorbers is in production phase while the other is in regeneration phase.

Such TSA air purification processes are described for instance in document U.S. Pat. No. 3,738,084.

The process, whether it is a PSA or TSA process, may involve one or more adsorbent beds, that is to say a multi-bed process.

The adsorbents used are, without being limiting, zeolites, activated aluminas, silica gels, exchanged zeolites, doped aluminas, etc.

Furthermore, depending on the case, the adsorbers may have their axis vertical or horizontal, or else they may be of the radial type, etc.

However, in all cases, the objective of the purification is to stop the $H_2O$ and $CO_2$ impurities, and the other possible contaminants likely to be present in the gas stream, down to contents compatible with the proper operation of the cryogenic unit, whatever the performance or safety level of the equipment.

This is because, in the absence of such an air purification treatment for removing its $CO_2$ and water impurities, there will be condensation and/or solidification of these impurities while cooling the air to cryogenic temperatures, which as a result may cause blockage problems in the equipment, especially the heat exchangers, distillation columns etc.

Furthermore, it is also common practice to remove, at least partially, the hydrocarbons and nitrogen oxide impurities liable to be present in the air so as to avoid any risk of damaging the equipment, particularly the distillation column or columns located downstream of the cold box.

Typically, the maximum values of impurity contents permitted are, at peak, less than 1 vpm and, on average, substantially less than this value of 1 vpm.

Usually, the various operating conditions that may be encountered on a site are taken into account when designing the unit so as to ensure that the cryogenic distillation unit located downstream of the air purifiers, this unit generally being called the ASU (Air Separation Unit), operates properly under all circumstances.

The improvements made hitherto to this type of process relate:

either to the selection of the adsorbents: nature, multi-bed, particle size etc.;

or to the processes themselves: regeneration temperature, choice of number of adsorbers, etc.;

or to reducing the energy in a given process.

With regard to the improvements made to the adsorbents or to the processes themselves, mention may especially be made of the following documents: U.S. Pat. No. 5,531,808, U.S. Pat. No. 5,587,003, U.S. Pat. No. 4,233,038, U.S. Pat. No. 5,232,474, EP-A-744,205, EP-A-590,946, EP-A909,823, EP-A-909,824, EP-A-909,825, EP-A-862,937, EP-A-862,936, EP-A-766,991, EP-A-766,989 and EP-A-862,938.

Moreover, with regard to the improvements made to the reduction in energy consumed, mention may be made of the documents: U.S. Pat. No. 4,472,178 relating to the recovery of the adsorption heat in a regenerator; U.S. Pat. No. 4,627,856 relating to a process allowing the necessary energy to be reduced by separately regenerating the adsorbent for stopping the water and the adsorbent for stopping the $CO_2$; and U.S. Pat. No. 5,766,311 relating to a regeneration process using multiple thermopulses.

The use of adsorbers in which the gas stream flows radially, allowing the head losses to be reduced, may also fall within this category, the reduction in energy then relating to the compression of the air.

All these methods therefore consist in using additional items of equipment: regenerator, internal heater, connecting pipework, etc.

Consequently, it will be immediately understood that these processes increase the complexity of the equipment.

It follows that the resulting increase in the costs of the plant must therefore be more than compensated for by energy saving so that these processes are useful from an industrial standpoint.

OBJECTS OF THE INVENTION

In contrast, the present invention aims to improve the known gas purification processes, particularly air purification processes, by appreciably reducing the amount of energy consumed.

In other words, the present invention aims to reduce the amount of energy consumed in the known gas purification processes no longer by adding expensive items of equipment but by optimizing the regeneration conditions at each cycle.

Put another way, the object of the present invention is to modify the operating conditions of a TSA-type gas purification process according to certain external parameters, such as the environmental conditions for example, so as to save energy by profiting from operating conditions which are more favourable than those considered during the design work, as conventionally done in the prior art, that is to say by using new calculation and regulation methods rather than new equipment.

Indeed, although a number of documents relating to processes for regulating gas purification units using TSA processes are known, none of them makes it possible to achieve performance levels as high as those obtained by the present invention.

By way of example, mention may be made of the documents:

- U.S. Pat. No. 3,808,773 which describes a process comprising a step of regenerating the adsorbent, beginning as soon as the $CO_2$ impurities break through, that is to say as soon as the bed of adsorbent is saturated by these $CO_2$ impurities. The regeneration conditions undergo no modification or variation during this regeneration step;
- U.S. Pat. No. 4,472,178 which specifies that the adsorption step terminates when the concentration of $CO_2$ impurities in the purified air reaches 1 vpm. Here again, the regeneration conditions undergo no modification or adjustment during the regeneration step;
- U.S. Pat. No. 5,531,808 which teaches a TSA-type unit equipped with conventional control and regulation means, that is to say with means for regulating the gas flow rates, in order to operate continuously in an efficient manner. According to that document, the adsorption step terminates when the $CO_2$ front reaches a defined point in the bed of adsorbent. No method allowing an energy saving to be made is described therein;
- U.S. Pat. No. 5,766,311 which relates to regeneration by multiple thermal pulses with selection of the waste gas flow rate and of the temperature variations, so as to control the desorption time. No regulation according to the operating conditions is described therein; and
- U.S. Pat. No. 5,846,295 which teaches control of the TSA unit based on the input temperature being regulated by means of a programme for controlling the duration and suitable means for controlling valves.

Thus, it will be understood that, hitherto, the known regulating processes have relied on satisfactory operation of the purification unit (no water breakthrough), (no $CO_2$ breakthrough, etc.), or on conventional regulation of the temperatures and/or flow rates.

As explained above, the object of the present invention is therefore to improve these known processes by an effective adaptation of the purification process not only in order to stop the impurities satisfactorily but also to save energy, as soon as the actual operating conditions so allow, by modifying the operating parameters of the purification cycle.

The invention therefore relates to a process for purifying a gas stream to be purified, containing at least one impurity chosen from carbon dioxide ($CO_2$) and water vapour ($H_2O$), comprising:

at least one step of adsorbing, on at least one bed of adsorbent contained in at least one adsorber, at least some of the impurities contained in the gas stream to be purified, the gas stream to be purified being at an adsorption temperature (Ta), and at least one step of regenerating at least some of the bed of adsorbent contained in the at least one adsorber with at least one regeneration gas introduced into the at least one adsorber, the regeneration temperature (Tr) of the regeneration gas being greater than the temperature (Ta) of the gas stream to be purified, characterized in that at least one energy parameter, chosen from the flow rate of the regeneration gas entering and/or leaving the at least one adsorber, the duration of the regeneration step and the regeneration temperature (Tr) of the regeneration gas entering the at least one adsorber, is controlled, modified and/or regulated depending on at least one operating condition chosen from the pressure of the gas stream to be purified entering and/or leaving the at least one adsorber, the flow rate of the gas stream to be purified entering and/or leaving the at least one adsorber, the temperature (Ta) of the gas stream to be purified entering the at least one adsorber and/or the content of at least one of the impurities contained in the gas stream to be purified entering the at least one adsorber and depending on the thermal profile of the heat front output by at least one adsorber at the end of regeneration.

Depending on the case, the process of the invention may include one or more of the following characteristics:

it includes at least one step of direct or indirect determination of at least one of the operating conditions;

at least one of the operating conditions is determined directly by at least one measurement of:

the pressure of the gas stream to be purified entering and/or leaving at least one adsorber, preferably by means of a pressure gauge;

the flow rate of the gas stream to be purified entering and/or leaving at least one adsorber, preferably by means of a flowmeter;

the temperature (Ta) of the gas stream to be purified entering at least one adsorber, preferably by means of a thermometer or a temperature sensor; and/or the content of at least one impurity in the gas stream to be purified entering at least one adsorber, preferably by means of a gas analyser;

at least one of the operating conditions is determined indirectly by at least one measurement taken from amongst:

one or more atmospheric conditions, preferably one or more atmospheric conditions chosen from the group formed by the temperature, the pressure and/or the relative humidity;

one or more conditions at the intake of at least one gas compressor which compresses the gas to be purified, preferably one or more conditions at the intake of the compressor which are chosen from the group formed by the temperature, the pressure and/or the relative humidity;

one or more pressure and/or temperature conditions at least within at least one fluid/liquid separator, the liquid to be separated being essentially atmospheric water and/or refrigeration water coming from direct contact heat exchange;

one or more temperature conditions in at least one bed of adsorbent; and one or more operating conditions of a gas compressor, particularly the energy consumed and/or the speed of rotation of the compressor;

at least one energy parameter is corrected according to the thermal profile as the heat front leaves, preferably by measuring the maximum temperature as the said heat front leaves and by comparing this measured maximum temperature with a predetermined target temperature;

the adsorption pressure is between 2 bar and 30 bar; and/or the regeneration pressure is between 1 bar and 30 bar; and/or the adsorption temperature (Ta) is between 0° C. and +80° C.; and/or the regeneration temperature (Tr) is between 20° C. and 200° C.;

the ratio of the regeneration rate to the adsorption rate is between 5% and 80%;

it includes at least one step of cryogenically distilling the purified gas stream leaving at least one adsorber;

the gas stream to be purified is air;

the regeneration gas is essentially nitrogen or a gas stream containing oxygen;

at least one bed of adsorbent contains an X zeolite having an Si/Al ratio ranging from approximately 1 to approximately 1.5 and/or at least one bed of activated alumina particles;

at least one bed of activated alumina articles is located upstream of at least one bed of X zeolite, preferably a bed of LSX zeolite having an Si/Al ratio of approximately 1;

it is chosen from among TSA processes;

the alumina is an alumina impregnated with a solution of alkali or alkaline-earth metal salts, preferably the alumina contains less than 10% by weight of one or more alkali or alkaline-earth metals and, in particular, the metal or metals are chosen from the group formed by sodium ($Na^+$), potassium ($K^+$) and calcium ($Ca^{2+}$)

the alumina contains at least 1% by weight of one or more alkali or alkaline-earth metals, preferably from 2 to 9.8% by weight of one or more alkali or alkaline-earth metals, and more preferably at least 3.5% by weight of one of more alkali or alkaline-earth metals;

the X zeolite, having an Si/Al ratio <1.15 and preferably about 1, is exchanged with or contains less than 35% potassium cations ($K^+$), from, 1 to 99% sodium cations ($Na^+$), and less than 99% calcium cations ($Ca^{2+}$), preferably from 0.01% to 12% potassium cations ($K^+$), from 1 to 99% calcium cations ($Ca^{2+}$) and from 1 to 99% sodium cations ($N^+$);

the X zeolite, having an Si/Al ratio <1.15 and preferably about 1, is exchanged with or contains less than 10% potassium cations ($K^+$), from 1 to 50% sodium cations ($Na^+$) and from 50 to 99% calcium cations ($Ca^{2+}$), preferably at least 66% calcium cations ($Ca^+$) and even more preferably from 80 to 96% calcium cations;

the X zeolite, having an Si/Al ratio <1.15 and preferably about 1, is exchanged with or contains from 0 to 7% potassium cations ($K^+$), from 4 to 11% sodium cations ($Na^+$) and from 82 to 92% calcium cations ($Ca^{2+}$);

the X zeolite, having an Si/Al ratio <1.15 and preferably about 1, is exchanged with or contains, in addition, from 0 to 98% lithium cations ($Li^+$), preferably from 60 to 96% lithium cations.

In addition, the invention also relates to a gas purification system, comprising:

at least one adsorber containing at least one bed of adsorbent;

at least one source of a gas stream to be purified, containing at least one impurity chosen from carbon dioxide ($CO_2$) and water vapour ($H_2O$);

at least one source of regeneration gas;

means for feeding at least the adsorber, in order to introduce or feed, alternately, the at least one adsorber;

with the gas stream to be purified, in order to adsorb at least some of the impurities contained in the gas stream to be purified on the adsorbent, and with the regeneration gas, in order to desorb at least some of the impurities adsorbed on the adsorbent;

control means for controlling, modifying and/or regulating at least one energy parameter chosen from the flow rate of the regeneration gas entering and/or leaving the at least one adsorber, the duration of the regeneration step and the regeneration temperature (Tr) of the regeneration gas entering the at least one adsorber, depending on at least one operating condition chosen from the pressure of the gas stream to be purified entering and/or leaving the at least one adsorber, the flow rate of the gas stream to be purified entering and/or leaving the at least one adsorber, the temperature (Ta) of the gas stream to be purified entering the at least one adsorber and the content of at least one of the impurities contained in the gas stream to be purified entering the at least one adsorber, and depending on the thermal profile of the heat front output by at least one adsorber at the end of regeneration.

Preferably, the system includes at least two adsorbers operating alternately, one being in regeneration phase while the other is in adsorption phase, that is to say the phase during which gas, in particular purified air, is produced.

By virtue of the present invention, major energy savings may be achieved by benefiting, depending on the cases encountered:

from a change in the operating conditions of other items of equipment generally located upstream of the purification, such as compressors, atmospheric exchangers, water-cooled air chiller, refrigerating unit; and/or from a reduction in the losses inherent in the process, such as for example the influx of heat into equipment operating at temperatures below ambient; and/or from changing the running conditions of the downstream unit(s) such as operating at a reduced rate for example.

This is because, in general, the removal of water and $CO_2$ is facilitated when the atmospheric temperature decreases.

The colder temperature of the compressed air leaving the final refrigeration stage of the compressor or of the refrigerating unit (which itself is favoured by a cold source at a lower temperature) limits the amount of water contained and therefore to be stopped by the adsorbent.

The $CO_2$ adsorption temperature decreases not only because the input temperature is lower, but also because the amount of heating due to the adsorption of water—in a smaller amount, is itself less.

The variations in the operation of a purification operation may be greater than merely the summer/winter and/or day/night environmental changes in the case of standard apparatuses intended to be used both in cold countries and in hotter countries, such as tropical countries.

Moreover, the air or fluid flow rate/pressure conditions ensuring regeneration may depend on the running of the unit and therefore the situation may therefore be one in which the purification is carried out under actual operating conditions which differ from the design conditions.

DETAILED DESCRIPTION OF THE INVENTION

The present invention will now be more clearly understood with the aid of examples and with reference to the appended figures, given by way of illustration but implying no limitation.

EXAMPLE 1

This example relates to a standard-type air purification and separation apparatus producing pure nitrogen in low volume.

The operating principle of the purification part of this apparatus is of the type described in document U.S. Pat. No. 5,137,548, to which the reader may refer for further details, and is illustrated in FIG. 1 appended hereto. This apparatus includes a decarbonating device 2 and means 6 for cooling compressed air.

As shown schematically in FIG. 1, the air leaving the compressor 1 is cooled to about the ambient temperature (20° to 25° C.) in the exchanger 1a and then down to approximately 5 to 10° C. through the exchangers 12 and 13.

After the condensed water 7 has been separated, the air is heated in 12 and then sent to the purification unit 8, 9.

The purification is carried out conventionally in the adsorber 8 through a double bed: activated alumina/X zeolite.

The air stripped of the water vapour and $CO_2$ and of most of the secondary contaminants, such as hydrocarbons and NOx, is then introduced into the cold box 3 where it is cooled (at 4) and fractionated (at 5) by cryogenic distillation.

The waste gas 14 serves for regenerating the other adsorber 9 before being vented to atmosphere via the line 15.

The heater 16 is an electrical heater which provides the power necessary to regenerate the adsorbent.

The demand put on this type of apparatus is always to produce the maximum amount of nitrogen so as to limit the consumption of liquid nitrogen in the storage tank 20 with which it is associated, which liquid nitrogen also, and preferably, serves to keep the air separation unit in question refrigerated.

Thus, for example, the air compressor 1 treats the entire air delivery possible and this is therefore greater in cold countries or in winter than in hot countries or in summer, respectively.

In addition, since the exchanger 13 is a conventional refrigerating unit, its performance also depends on the external temperature conditions.

In practice, the characteristics of the stream of air leaving 12, that is to say at the input of the purification stage, depend entirely on the environmental conditions, etc.

When it is hot and humid, a higher temperature, a greater quantity of water and a slightly lower delivery is obtained than when it is cold and dry.

The purification stage must therefore be designed for extreme conditions so as not to limit the production capacity of the unit.

In particular, these conditions fix the power of the electrical heater.

Consequently, in this type of unit, this power will be varied depending on the actual atmospheric conditions so as to minimize the energy consumption while, for the sake of simplicity, the duration of the various steps will be kept constant.

Since the main parameter is the amount of water to be desorbed at each cycle, the output temperature of the electrical heater 16 will advantageously be adapted by taking, as parameter, the temperature at 7 (called hereafter T7).

In practice, the setpoint (i.e. the output temperature of the heater) is in this case a function F of T7.

It would also be possible to vary this setpoint according to the external environmental conditions.

This system therefore makes it possible, by reducing the temperature of the heater, when the adsorption conditions are more favourable, to make energy savings.

It should be noted that, in this example, chosen intentionally to be very simple, the determination of the function P is not a trivial matter.

This is because it must incorporate a series of effects caused by the variation in the atmospheric conditions, namely:

the modification in the air input;

the consequent modification in the waste gas output;

the change in the heat losses. In this type of unit, the adsorbers are not insulated because of the low regeneration temperatures. The heat losses are therefore directly tied to the regeneration temperature;

the modification in the input/output heat balance of the adsorber, etc. A change in the regeneration temperature introduces, consequently, a modification in the output temperature profile. The heat available for the regeneration (desorption of the impurities) is the difference between the incoming quantity of heat and the outgoing quantity of heat;

the change in the amount of water adsorbed according to the Vapour pressure/Temperature law.

With regard to standard units, the height above sea level of the site must also be taken into account as this can appreciably modify the operating conditions of the unit (flow rates, pressures etc.).

EXAMPLE 2

This example relates to the TSA-type purification for a large-capacity ASU. In this case, the energy consumption due to the regeneration becomes considerable in absolute terms and the system for adapting the cycle to the actual operating conditions is more sophisticated than that described above.

Instead of keeping the duration of the steps constant and of only varying just the power of the heater, the optimum durations of the steps at any moment are calculated by taking into account the design and the operating conditions.

This situation is no longer a simple saving, as above, but a complete optimization of the adsorption unit.

Thus, in the case of the heating regeneration phase, the system, at each scan, accumulates the quantities of heat supplied and the decision to stop heating is made as soon as the accumulated energy $E_c$ becomes greater than the quantity of heat $E_o$ needed for the regeneration, this quantity itself being calculated depending on the amounts of water and of $CO_2$ adsorbed previously in the adsorber in question.

The regeneration rate used in the calculation of the energy input into the bottle undergoing regeneration can be measured, or obtained by calculation, for example from the difference between the flow rate of air entering the ASU and the production rates, or fixed proportionally to the delivery rate of treated air, the proportionality factor possibly depending on the type of operation in which the apparatus is being run, if this unit has been designed to operate under different running conditions as for production rates.

With regard to the adsorption, the portion of adsorbent used from the start of the cycle in order to stop the impurities present in the air to be treated is calculated at every instant. By accumulating these values at each scan starting from the bringing of a bottle into service, the degree of saturation of the adsorbent, or of each of the adsorbents in the case of multi-beds, is obtained.

The decision to send gas into the adsorber until now undergoing regeneration (at the end of cooling), in order to increase the pressure therein, is made when the remaining fraction of capacity for one of the adsorbents of the unit during the purification phase corresponds to that which will be consumed during the period necessary for the reversal (repressurization, possible shunting, etc.).

The portion of adsorbent used may be calculated as a function of the actual operating conditions of the purification unit by inputting a design model into the control system.

Since this method is generally too complex to be used in practice, a development limited to the first order may take account of the variations in adsorption capacity as a function of the feed conditions (pressure, temperature and delivery rate).

For a more accurate approach, the optimum adsorption and regeneration times are recalculated during the design of the unit while taking into account the design run for a representative series of points of the possible operating range of the unit as a function of the atmospheric conditions and of the planned types of operation.

A multi-variable regression program then makes it possible to define the optimum coefficients to be used in order to adapt the cycle to the operating conditions.

The number of calculation points used may range from 3 for a unit with a single operation up to 72 in the case of the more complex units (multiple products, multi-purity, variable gas/liquid production).

In general, the parameters used for the adsorption phase are the air delivery rate and the pressure and temperature at the input of the purification stage, knowing that, in the great majority of cases, the air leaving the final refrigerating stage of the compressor is saturated with water and that, as regards the $CO_2$, this generally remains within a small concentration range. If necessary, the concentrations may be taken into account by the system.

It will also be noted that the change in the temperature in the bed during the adsorption phase may provide, indirectly, information about the rate (speed of propagation of the front) and about the amount of water since the increase in temperature is, to a first approximation, proportional to the amount of water contained in the gas.

Likewise, a measurement (an electrical or other measurement) on the compressor may provide indirect information about the operating point (rate, pressure).

With regard to regeneration, the usual parameters are the regeneration rate and the temperature of the regeneration gas.

It will be noted that the method used when it is based on the regeneration temperature directly at the input of the adsorber automatically takes into account the heat losses and the response time of the heater.

EXAMPLE 3

The principle of the method described above can be adapted in the case of particular apparatuses.

Thus, Example 3 relates to a large-capacity air separation apparatus whose waste gas serving for the regeneration of the drying/decarbonization unit is not discharged into the atmosphere, as is usually the case, but is used, under pressure, in an upstream unit. This pressure can vary around a nominal value depending on the operation of the downstream unit.

The air fractionation apparatus is tailored to the pressure required for its own energy optimization.

Thus, the regeneration pressure may vary over time.

The above model was designed to take this parameter into account in the regeneration.

In particular, the energy $E_o$ needed for the regeneration is corrected according to the pressure of the waste gas by means of a polynomial having this pressure as the variable.

The expression used in this case is, as an example:

$$E_O = (1+\epsilon)(QH_2O \Sigma mH_2O \Delta t + QCO_2 \Sigma mCO_2 \Delta t + Q_S)(a + bP/P_o)$$

where:

$\Sigma mH_2O \Delta t$ and $\Sigma mCO_2 \Delta t$ are, respectively, the amounts of water and $CO_2$ input during the adsorption phased of the bottle ($MH_2O$ being determined at each scan according to the flow rate, pressure and temperature conditions of the feed, etc.);

a and b being the parameters obtained by calculation;

P being the actual pressure of the waste gas;

$P_o$ being the nominal pressure of the same gas;

$QH_2O$ and are the average heats of adsorption of water and of $CO_2$ on the adsorbents used;

Qs is the excess amount of energy making it possible to compensate for the heat losses (this being constant or a function of the regeneration).

The expression within the last pair of brackets allows the effect of the variation in pressure of the waste gas to be taken into account.

Finally, the coefficient $\epsilon$ allows the theoretical amount of heat for obtaining the desired heat front output on the plant in question to be adjusted. It is possible to vary the coefficient & automatically within a small range compared with the initial coefficient $\epsilon_o$ (for example between $0.90\epsilon_o$ and $1.10\epsilon_o$) in order to be even more accurately set onto the desired temperature output profile. This may be the case in order to better take into consideration the variations in heat losses between winter and summer for example, etc.

This setting may be made for example, with regard to a maximum adsorber output temperature level at the end of regeneration.

The latter parameter is then used to adjust the predictive calculation but not to directly regulate the regeneration since, when the heat front leaves the adsorber, it is generally too late to usefully vary the current operating conditions.

More generally, the automatic air purification management system makes it possible to display, continuously, a number of parameters, such as the degree of saturation of the beds, the times remaining before breakthrough, assuming that the conditions remain the same as those of the last scan, the degree of progress of the regeneration, etc.

It may be equipped with alarms indicating operating faults (such as a low adsorber input temperature in the heating phase, etc.), inconstancies in the step durations (insufficient cooling time, etc.) which make it possible to react, if necessary, in time to avoid any accidental contamination or disruption in the operation of the ASU.

The various parameters in the model, which are determined theoretically during the design of the unit, may, if necessary, be adjusted in order to set the actual operating points better and to take advantage of any safety or overdesign characteristics.

This may, for example, be the case for the coefficient $\epsilon$ in the above formula, as was seen.

What is claimed is:

1. Process for purifying a gas stream to be purified, containing at least one impurity chosen from carbon dioxide ($CO_2$) and water vapour ($H_2O$), comprising:

at least one step of adsorbing, on at least one bed of adsorbent contained in at least one adsorber, at least some of the impurities contained in the gas stream to be purified, the gas stream to be purified being at an adsorption temperature (Ta), and at least one step of regenerating at least some of said bed of adsorbent contained in said at least one adsorber with at least one regeneration gas introduced into said at least one adsorber, the regeneration temperature (Tr) of said regeneration gas being greater than the temperature (Ta) of the gas stream to be purified, wherein at least one energy parameter, chosen from the flow rate of the regeneration gas entering and/or leaving said at least one adsorber, the duration of the regeneration step and the regeneration temperature (Tr) of said regeneration gas entering said at least one adsorber, is controlled, modified and/or regulated depending on at least one operating condition chosen from the pressure of the gas stream to be purified entering and/or leaving said at least one adsorber, the flow rate of the gas stream to be purified entering and/or leaving said at least one adsorber, the temperature (Ta) of the gas stream to be purified entering said at least one adsorber and/or the content of at least one of said impurities contained in the gas stream to be purified entering said at least one adsorber and depending on the thermal profile of the heat front output by at least one adsorber at the end of regeneration;

the maximum temperature during the output of said heat front being measured and said measured maximum temperature being compared with a predetermined target temperature.

2. The process according to claim 1, wherein at least one of said operating conditions is determined directly by at least one measurement of:

the pressure of the gas stream to be purified entering and/or leaving at least one adsorber;

the flow rate of the gas stream to be purified entering and/or leaving at least one adsorber;

the temperature (Ta) of the gas stream to be purified entering at least one adsorber; and/or the content of at least one impurity in the gas stream to be purified entering at least one adsorber.

3. The process according to claim 1, wherein at least one of said operating conditions is determined indirectly by at least one measurement taken from amongst:

one or more atmospheric conditions chosen from the group formed by the temperature, the pressure and/or the relative humidity;

one or more conditions at the intake of at least one gas compressor which compresses the gas to be purified, said one or more conditions at the intake of the compressor being chosen from the group formed by the temperature, the pressure and/or the relative humidity;

one or more pressure and/or temperature conditions at least within at least one fluid/liquid separator, the liquid to be separated being essentially atmospheric water and/or refrigeration water coming from direct contact heat exchange;

one or more temperature conditions in at least one bed of adsorbent; and one or more operating conditions of a gas compressor.

4. The process according to claim 1, wherein at least one bed of adsorbent contains an X zeolite having an Si/Al ratio ranging from approximately one to approximately 1.5 and/or at least one bed of activated alumina particles.

5. The process according to claim 1, wherein at least one bed of activated alumina particles is located upstream of at least one bed of LSX zeolite having an Si/Al ratio of approximately 1.

6. The process according to claim 1, wherein:

the adsorption pressure is between 2 bar and 30 bar; and/or the regeneration pressure is between 1 bar and 30 bar; and/or the adsorption temperature (Ta) is between 0° C. and +80° C.; and/or the regeneration temperature (Tr) is between 20° C. and 200° C.

7. The process according to claim 1, wherein the ratio of the regeneration rate to the adsorption rate is between 5% and 80%.

8. The process according to claim 1, further comprising at least one step of cryogenically distilling the purified gas stream leaving at least one adsorber.

9. The process according to claim 1, wherein the gas stream to be purified is air.

10. The process according to claim 1, wherein the regeneration gas is essentially nitrogen or a gas stream containing oxygen.

11. The process according to claim 1, wherein said process is a TSA process.

12. Gas purification system, comprising:

at least one adsorber containing at least one bed of adsorbent;

at least one source of a gas stream to be purified, containing at least one impurity chosen from carbon dioxide ($CO_2$) and water vapour ($H_2O$);

at least one source of regeneration gas;

means for feeding at least said adsorber, in order to introduce or feed, alternately, said at least one adsorber;

with the gas stream to be purified, in order to adsorb at least some of said impurities contained in said gas stream to be purified on said adsorbent, and with the regeneration gas, in order to desorb at least some of said impurities adsorbed on said adsorbent;

control means for controlling, modifying and/or regulating at least one energy parameter chosen from the flow rate of the regeneration gas entering and/or leaving said at least one adsorber, the duration of the regeneration step and the regeneration temperature (Tr) of said regeneration gas entering said at least one adsorber, depending on at least one operating condition chosen from the pressure of the gas stream to be purified entering and/or leaving said at least one adsorber, the flow rate of the gas stream to be purified entering and/or leaving said at least one adsorber, the temperature (Ta)

of the gas stream to be purified entering said at least one adsorber and the content of at least one of said impurities contained in the gas stream to be purified entering said at least one adsorber, and depending on the thermal profile of the heat front output by at least one adsorber at the end of regeneration;

means for measuring the maximum temperature during the output of said heat front; and means for comparing said measured maximum temperature with a predetermined target temperature.

* * * * *